United States Patent
Yan et al.

(10) Patent No.: US 12,394,117 B2
(45) Date of Patent: Aug. 19, 2025

(54) MEDICAL IMAGE RECONSTRUCTION METHOD, COMPUTER DEVICE AND STORAGE MEDIUM

(71) Applicant: OUR UNITED CORPORATION, Xi'an (CN)

(72) Inventors: Hao Yan, Xi'an (CN); Shaojie Chang, Xi'an (CN); Jinsheng Li, Xi'an (CN)

(73) Assignee: OUR UNITED CORPORATION, Xi'an (CN)

( * ) Notice: Subject to any disclaimer, the term of this patent is extended or adjusted under 35 U.S.C. 154(b) by 597 days.

(21) Appl. No.: 17/539,737

(22) Filed: Dec. 1, 2021

(65) Prior Publication Data
US 2022/0172412 A1    Jun. 2, 2022

(30) Foreign Application Priority Data
Dec. 1, 2020    (CN) .......................... 202011389521.2

(51) Int. Cl.
*G06T 11/00*    (2006.01)

(52) U.S. Cl.
CPC .......... *G06T 11/006* (2013.01); *G06T 11/005* (2013.01); *G06T 2210/41* (2013.01); *G06T 2211/421* (2013.01); *G06T 2211/424* (2013.01)

(58) Field of Classification Search
CPC ....... G06T 2210/41; G06T 2207/30004; G06T 11/003; G06V 10/10
See application file for complete search history.

(56) References Cited

U.S. PATENT DOCUMENTS

| | | | |
|---|---|---|---|
| 2003/0158829 A1* | 8/2003 | Kam | G06N 3/02 706/15 |
| 2005/0220265 A1* | 10/2005 | Besson | G21K 1/10 378/16 |

(Continued)

FOREIGN PATENT DOCUMENTS

| | | |
|---|---|---|
| CA | 2 360 656 A1 | 4/2002 |
| CN | 103153192 A | 6/2013 |

(Continued)

OTHER PUBLICATIONS

Smith et al., Reconstruction of SPECT images using generalized matrix inverses, in IEEE Transactions on Medical Imaging, vol. 11, No. 2, pp. 165-175, Jun. 1992, doi: 10.1109/42.141640.*

(Continued)

*Primary Examiner* — Guillermo M Rivera-Martinez
(74) *Attorney, Agent, or Firm* — Morgan, Lewis & Bockius LLP

(57) ABSTRACT

A medical image reconstruction method includes: obtaining real projection data collected by a medical imaging device; obtaining an inverse matrix corresponding to the medical imaging device that is physically stored in advance, in which the inverse matrix is obtained by performing an inverse operation based on a system matrix corresponding to the medical imaging device, and the system matrix indicating a geometrical relationship between projection rays of the medical imaging device at each view angle and of reconstructed image pixels; and determining a reconstructed image of the real projection data according to the real projection data and the inverse matrix. By storing a large inverse matrix of the system matrix, rapid image reconstruction may be achieved through the inverse matrix and the real projection data, reconstruction efficiency of a medical image may be improved, and wide application and development of (Continued)

iterative reconstruction technology in clinical practice may be promoted.

17 Claims, 3 Drawing Sheets

(56) References Cited

U.S. PATENT DOCUMENTS

| | | | |
|---|---|---|---|
| 2006/0159362 A1* | 7/2006 | Sasaki | G06T 3/4015 382/269 |
| 2007/0147580 A1 | 6/2007 | Wu et al. | |
| 2009/0123048 A1* | 5/2009 | Leroux | G06T 11/006 250/363.04 |
| 2010/0266171 A1* | 10/2010 | Wendler | A61B 6/5205 382/128 |
| 2011/0044524 A1* | 2/2011 | Wang | G01R 33/5601 382/131 |
| 2011/0262054 A1* | 10/2011 | Benson | G06T 11/006 382/275 |
| 2012/0155736 A1* | 6/2012 | Faul | A61B 6/5235 382/131 |
| 2013/0177132 A1 | 7/2013 | Takahashi et al. | |
| 2014/0369581 A1* | 12/2014 | Fu | G06T 11/006 382/131 |
| 2015/0243070 A1* | 8/2015 | Ra | A61B 6/5217 382/131 |
| 2016/0135774 A1 | 5/2016 | Ono et al. | |
| 2016/0310086 A1* | 10/2016 | Besson | A61B 6/5205 |
| 2016/0367212 A1* | 12/2016 | Tang | A61B 6/5205 |
| 2018/0025514 A1* | 1/2018 | Bouman | G06T 1/60 382/131 |
| 2019/0076101 A1* | 3/2019 | Pan | A61B 6/032 |
| 2020/0107794 A1* | 4/2020 | Mandelkern | A61B 6/58 |
| 2020/0163643 A1* | 5/2020 | Desaute | A61B 6/5294 |

FOREIGN PATENT DOCUMENTS

| | | |
|---|---|---|
| CN | 105844690 A | 8/2016 |
| CN | 105931280 A | 9/2016 |
| CN | 107945114 A | 4/2018 |
| JP | H09161041 A * | 12/1995 |
| JP | 9-161041 A | 6/1997 |

OTHER PUBLICATIONS

Smith et al., Generalized matrix inverse reconstruction for SPECT using a weighted singular value spectrum, in IEEE Transactions on Nuclear Science (1996), vol. 43, No. 3, pp. 2008-2017, Jun. 1996, doi: 10.1109/23.507261.*

Office Action issued on May 28, 2024 in Chinese Patent Application No. 202011389521.2.

China Academy of Engineering Physics, Research on CUDA-based GPU-accelerated iterative reconstruction algorithm, 1994-2021 China Academic Journal Electronic Publishing House. All rights reserved. http://www.cnki.net with English translation.

Zeng et al., Unmatched Projector Backprojector Pairs in an Iterative Reconstruction Algorithm, IEEE Transactions on Medical Imaging, vol. 19, No. 5, May 2000.

Office Action issued on Dec. 19, 2024 in Chinese Patent Application No. 202011389521.2 with English translation. Note: JPH09161041A and CN105931280A cited therein are already of record.

Liyu, Medical tomography image reconstruction simulation experiment, Experimental Textbooks for Medical Imaging Technology Courses, Key Planning Textbooks for Biomedical Engineering Patents in Colleges and Universities, Jan. 2015, ISBN: 978-7-5606-3542-2.

Office Action issued on Apr. 24, 2025 in Chinese Patent Application No. 202011389521.2 with English translation Note: JPH09161041A, CN105931280A, CN103153192A, CN105844690A, Zeng et al. and China Academy of Engineering Physics (NPL) cited therein are already of record.

* cited by examiner

MEDICAL IMAGE RECONSTRUCTION METHOD, COMPUTER DEVICE AND STORAGE MEDIUM

CROSS-REFERENCE TO RELATED APPLICATION

This application claims priority to Chinese Patent Application No. 202011389521.2, filed on Dec. 1, 2020, which is incorporated herein by reference in its entirety.

TECHNICAL FIELD

The present disclosure relates to the field of medical imaging technologies, and in particular, to a medical image reconstruction method, a computer device and a storage medium.

BACKGROUND

Computed tomography (CT) has been widely applied in fields such as human tissue imaging and industrial non-destructive testing. CT reconstruction algorithms may be classified into two categories, i.e., an iterative reconstruction algorithm and an analytical reconstruction algorithm.

SUMMARY

In a first aspect, a medical image reconstruction method performed by a computer device is provided. The computer device is communicatively connected to a medical imaging device. The medical image reconstruction method includes: obtaining real projection data collected by the medical imaging device; obtaining an inverse matrix corresponding to the medical imaging device that is physically stored in advance, the inverse matrix being obtained by performing an inverse operation based on a system matrix corresponding to the medical imaging device, and the system matrix corresponding to the medical imaging device indicating a geometrical relationship between projection rays of the medical imaging device at each view angle and reconstructed image pixels; and determining a reconstructed image of the real projection data according to the real projection data and the inverse matrix.

In some embodiments, the inverse matrix indicates calculated projection data corresponding to the medical imaging device. Determining the reconstructed image of the real projection data according to the real projection data and the inverse matrix includes: determining the reconstructed image of the real projection data according to the real projection data and the calculated projection data.

In some embodiments, determining the reconstructed image of the real projection data according to the real projection data and the calculated projection data includes: comparing the real projection data and the calculated projection data to obtain projection difference data; and updating the projection difference data through a back-projection and forward-projection iteration until the projection difference data is minimum, so that the reconstructed image of the real projection data is obtained.

In some embodiments, updating the projection difference data through a back-projection and forward-projection iteration until the projection difference data is minimum, so that the reconstructed image of the real projection data is obtained includes: performing a back projection according to the projection difference data to obtain a current reconstructed image of the real projection data; and performing a forward projection for the current reconstructed image to update current calculated projection data until the projection difference data is minimum.

In some embodiments, the iterative methods include a simultaneous algebraic reconstruction technique (SART), weighted least squares (WLS), or maximum likelihood-expectation maximization (ML-EM).

In some embodiments, the inverse matrix is generalized, and performing the inverse operation based on the system matrix corresponding to the medical imaging device includes: obtaining the system matrix corresponding to the medical imaging device; and determining the generalized inverse matrix of the system matrix according to the system matrix.

In some embodiments, the projection data includes forward-projection data, and the system matrix includes a forward-projection matrix. Alternatively, the projection data includes back-projection data, and the system matrix includes a back-projection matrix. Alternatively, the projection data includes both the forward-projection data and the back-projection data, and the system matrix includes both the forward-projection matrix and the back-projection matrix.

In some embodiments, obtaining the system matrix corresponding to the medical imaging device includes: scanning a preset calibration phantom in the medical imaging device to obtain sample projection data; and determining the system matrix corresponding to the medical imaging device based on a preset mathematical model, the preset mathematical model indicating an operational relationship among the calibration phantom, the sample projection data and the system matrix.

In some embodiments, determining the generalized inverse matrix of the system matrix according to the system matrix includes: performing singular value decomposition on the system matrix to obtain the generalized inverse matrix of the system matrix.

In some embodiments, the generalized inverse matrix of the system matrix is stored in the computer device.

In some embodiments, the generalized inverse matrix of the system matrix is compressed into a compressed matrix before being stored in the computer device.

In some embodiments, the compression method includes symmetric matrix compression, upper triangular matrix compression, lower triangular matrix compression, or sparse matrix compression.

In some embodiments, obtaining the inverse matrix corresponding to the medical imaging device includes: obtaining the compressed matrix of the inverse matrix; and decompressing the compressed matrix to obtain the inverse matrix.

In some embodiments, the method further includes: obtaining a priori knowledge of a diagnostic image in a preset application scenario; and processing the reconstructed image according to the priori knowledge to obtain a processed reconstructed image.

In some embodiments, the reconstructed image of the real projection data, the real projection data and the inverse matrix satisfy the following relationship: $x = A^{Pinv} b$, in which x is the reconstructed image of the real projection data, $A^{Pinv}$ is the inverse matrix, and b is the real projection data.

In some embodiments, before the real projection data collected by the medical imaging device is obtained, the medical image reconstruction method further includes: pre-processing raw projection data collected by the medical imaging device to obtain the real projection data. The pre-processing method includes at least one of image enhancement, filtering, dictionary learning, or morphological component analysis.

In a second aspect, a computer device is provided. The computer device includes: at least one processor; a memory; and at least one application program that is stored in the memory, and is configured to cause the processor to perform the medical image reconstruction method according to the first aspect.

In a third aspect, a non-transitory computer-readable storage medium is provided. The non-transitory computer-readable storage medium stores computer program instructions that, when executed by a processor, cause the processor to perform the medical image reconstruction method according to the first aspect.

BRIEF DESCRIPTION OF THE DRAWINGS

To describe technical solutions in embodiments of the present disclosure more clearly, accompanying drawings to be used in the description of the embodiments will be introduced briefly below. However, the accompanying drawings to be described below are merely some embodiments of the present disclosure, and a person skilled in the art may obtain other drawings based on these drawings without paying any creative effort.

DETAILED DESCRIPTION

Figure 1:
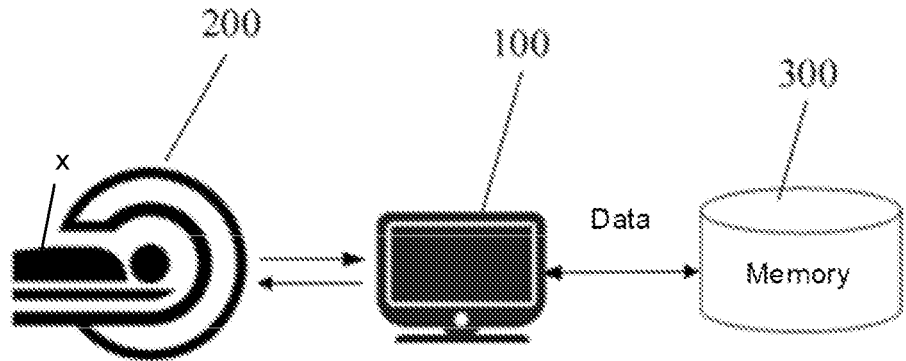
FIG. 1 is a schematic diagram of a scenario of a medical image reconstruction system, following some embodiments.

The technical solutions in the embodiments of the present disclosure will be described clearly and completely regarding the accompanying drawings. However, the described embodiments are merely some but not all embodiments of the present disclosure. All other embodiments obtained by a person skilled in the art based on the embodiments of the present disclosure without paying any creative effort shall be included in the protection scope of the present disclosure.

It will be understood that in the description of the present disclosure, orientations or positional relationships indicated by the terms such as "center", "longitudinal", "transverse", "length", "width", "thickness", "upper", "lower", "front", "rear", "left", "right", "vertical", "horizontal", "top", "bottom", "inner" and "outer" are based on orientations or positional relationships shown in the accompanying drawings. They are merely to facilitate and simplify the description of the present disclosure, but not to indicate or imply that the devices or elements referred to each must have a particular orientation, or each must be constructed or operated in a particular orientation. Therefore, they cannot be construed as limitations on the present disclosure.

In addition, the terms "first" and "second" are used for descriptive purposes only, and are not to be construed as indicating or implying the relative importance or implicitly indicating the number of indicated technical features. Thus, features defined as "first" and "second" may explicitly or implicitly include one or more of the features. In the description of the present disclosure, the term "a plurality of" means two or more unless otherwise specified.

The phrase "for example" herein is used to indicate an example, an illustration, or a description. Any embodiment described as "for example" in the present disclosure is not necessarily construed as being preferred or advantageous over other embodiments. To enable any person skilled in the art to implement and use the present disclosure, the following description is given. In the following description, details are listed for a purpose of explanation. It will be understood that a person of ordinary skill in the art may realize that the present disclosure may also be implemented without using these specific details. In other embodiments, well-known structures and processes will not be described in detail to prevent unnecessary details from obscuring the description of the present disclosure. Therefore, the present disclosure is not intended to be limited to the embodiments shown, but is consistent with the widest scope that conforms to principles and features disclosed in the present disclosure.

It will be noted that the method in the embodiments of the present disclosure is performed in a computer device, and processing objects of various computer devices all exist in a form of data or information. For example, time is essentially time information. Therefore, it can be understood that, if a size, a number, a position, and the like are mentioned in subsequent embodiments, they are corresponding data for processing by the computer device, and details will not be repeated herein.

The analytical reconstruction algorithm has advantages of simple algorithm and fast reconstruction speed, and has disadvantages of high requirements on completeness of data, and great influence of noise in projection data on a quality of a reconstructed image. Compared with the analytical reconstruction algorithm, the iterative reconstruction algorithm has advantages of high quality of a reconstructed image, being suitable for collecting data in various forms, and being capable of reconstructing a good image even in the case of projection data at a limited view angle. Typical iterative reconstruction algorithms include a simultaneous algebraic reconstruction technique (SART), weighted least squares (WLS) and maximum likelihood-expectation maximization (ML-EM). However, a large amount of calculation, a slow convergence speed and a long reconstruction time have become the biggest bottlenecks that restrict the wide application of the iterative reconstruction algorithm.

For the iterative reconstruction algorithm, the reconstructed image is calculated through the projection data in a case of a given system matrix. In general medical imaging applications, the system matrix is so large that the entire matrix cannot be stored in a computer simultaneously, thereby causing the impossibility to directly perform the transform of the system matrix. Therefore, in conventional iterative reconstruction, only an iteration method using the system matrix and a transpose matrix (without transform) thereof may be used to find an approximate solution of an equation set, which causes long iteration time and impossibility to solve the equation set quickly.

Some basic concepts involved in the embodiments of the present disclosure will be first described below.

Iterative reconstruction technology: the image reconstruction problem is formulated as an objective function, and an image is obtained through a series of approximate calculations in a gradual approximation manner. Before image reconstruction starts, assume that the image is of uniform density. Each step of the image reconstruction includes comparing calculated projection data of the image reconstructed in a previous step with real projection data obtained through measurement, and updating the image by using a difference between the real projection data and the calculated projection data. Each step makes the image closer to an original object, and a satisfactory image may be obtained after several corrections. Finally, a reconstructed image close to the ground truth can be obtained after the above optimization with several iterations. However, a disadvantage of the iterative reconstruction technology is the huge computational cost.

Generalized inverse matrix: supposing $A \in C^{m*n}$, if a matrix $X \in C^{n*m}$, and satisfies some or all of the following four Penrose equations:

$$AXA = A;$$

$$XAX = X;$$

$$(AX)^H = AX; \text{ and}$$

$$(XA)^H = XA,$$

then the matrix X is referred to as a generalized inverse matrix of the matrix A. If the matrix X satisfies all the four equations, then the matrix X is referred to as a Moore-Penrose inverse of the matrix A.

Radon transform: it is an integral transform, and integrates a function f(x, y) defined on a two-dimensional plane over a set of straight lines on the plane, which is equivalent to performing computed tomography (CT) scans on the function f(x, y). Its basic application is to reconstruct the function f(x, y) before projections (or line integrals) according to an intensity of transmissive light of a CT device, i.e., an inversion of the Radon transform. The Radon transform was proposed by Radon in 1917. He also proposed an inversion formula of the Radon transform and a formula of the Radon transform in three-dimensional space.

If the function f(x, y) represents an unknown density, performing the Radon transform of f(x,y) is equivalent to obtaining a projected signal of f(x, y). For example, f(x, y) is equivalent to human tissue, and outputting a signal by the CT is equivalent to performing the Radon transform of f(x, y). An original density function f(x, y) may be reconstructed according to projected results by using an inverse Radon transform. The Radon transform is a mathematical theoretical basis for reconstructing a CT scan. Another well-known term is three-dimensional reconstruction. A signal after the Radon transform is referred to as a "sinogram", since Radon transform of an off-center point is a sine curve. Therefore, Radon transform of multiple point-like distributions looks like a superposition of numerous sinusoidal functions with different amplitudes and phases.

Embodiments of the present disclosure provide a medical image reconstruction method, a medical image reconstruction apparatus, a computer device, and a storage medium, which will be separately described in detail below.

Referring to FIG. 1, FIG. 1 is a schematic diagram of a scenario of a medical image reconstruction system, in accordance with some embodiments. The medical image reconstruction system may include a computer device 100 and a medical imaging device 200. The computer device 100 is communicatively connected to the medical imaging device 200, so that medical data (e.g., real projection data) collected by the medical imaging device 200 may be transmitted to the computer device 100. The computer device 100 is integrated with a medical image reconstruction apparatus.

The computer device 100 is configured to: obtain the real projection data collected by the medical imaging device 200; obtain an inverse matrix corresponding to the medical imaging device 200 that is physically stored in advance, in which the inverse matrix is obtained by performing an inverse operation based on a system matrix corresponding to the medical imaging device 200, the system matrix indicating a geometrical relationship between projection rays of the medical imaging device 200 at each view angle and reconstructed image pixels, and the inverse matrix indicating calculated projection data corresponding to the medical imaging device 200; and determine a reconstructed image of the real projection data according to the real projection data and the inverse matrix.

The computer device 100 may be a stand-alone server, or a server network or a server cluster composed of servers. For example, the computer device 100 includes, but is not limited to, a computer, a network host, a single network server, a cluster of multiple network servers, or a cloud server composed of multiple servers. The cloud server is composed of a large number of computers or network servers based on cloud computing.

It can be understood that, the computer device 100 may also be a terminal. The terminal may be a device that includes both receiving hardware and transmitting hardware, that is, a device that has receiving hardware and transmitting hardware capable of performing two-way communication on a two-way communication link. Such a device may include a cellular or any other communication device having a single-line display or a multi-line display, or a cellular or any other communication device without a multi-line display. For example, the terminal may be a desktop terminal, such as a desktop computer.

It can be understood that, the application scenario shown in FIG. 1 is only one application scenario of the embodiments of the present disclosure, and does not constitute a limitation on application scenarios of the embodiments of the present disclosure. Other application scenarios may further include more or fewer computer devices than those shown in FIG. 1. For example, FIG. 1 shows only one computer device. It can be understood that, the medical image reconstruction system may further include one or more other computer devices, which is not limited herein.

In addition, as shown in FIG. 1, the medical image reconstruction system may further include a memory 300 for storing medical data, such as the system matrix and the inverse matrix corresponding to the medical imaging device 200.

For example, the medical imaging device 200 may be a CT device, a cone beam computed tomography (CBCT) device or any other medical imaging device, such as a positron emission tomography-computed tomography (PET-CT) device, which is not limited herein. Correspondingly, the medical image described herein may refer to a CT image.

It will be noted that, the schematic diagram of the scenario of the medical image reconstruction system shown in FIG. 1 is merely an example. The medical image reconstruction system and the scenario described in the embodiments of the present disclosure are intended to describe the technical solutions in the embodiments of the present disclosure more clearly, and do not constitute limitations on the technical solutions provided by the embodiments of the present disclosure. A person of ordinary skill in the art can understand that, with the evolution of the medical image reconstruction system and the emergence of new business scenarios, the technical solutions provided by the embodiments of the present disclosure are also applicable to similar technical problems.

Firstly, some embodiments of the present disclosure provide a medical image reconstruction method. The medical image reconstruction method may be performed by at least one processor in the computer device. The medical image reconstruction method includes: obtaining real projection data collected by the medical imaging device; obtaining an inverse matrix corresponding to the medical imaging device that is physically stored in advance, in which the inverse matrix is obtained by performing an inverse operation based on a system matrix corresponding to the medical imaging device, the system matrix indicating a geometrical relationship between projection rays of the medical imaging device at each view angle and reconstructed image pixels, and the inverse matrix indicating calculated projection data corresponding to the medical imaging device; and determining a reconstructed image of the real projection data according to the real projection data and the inverse matrix.

Generally, a process of establishing an objective function to obtain the reconstructed image through a set of line integrals based on Beer's Law is described as follows. Supposing that a two-dimensional map of linear attenuation coefficient values that is to be reconstructed is vectorized as $x=\{x_j|j=1, \ldots, J\} \in R^J$, in which $x_j$ represents a pixel value (e.g., a gray value or a density value) of a j-th pixel in an image x, and J is a total number of pixels in the image. Supposing that projection line integral values b over a total of I rays are collected, the projection line integral values b are discretely vectorized as $b=\{b_i|i=1, \ldots, I\} \in R^I$. $A=\{a_{ij}|i=1, \ldots, I, j=1, \ldots, I, J\} \in R^{I \times J}$ is used to represent a geometrical mathematical model of the medical imaging device, and the geometrical mathematical model is referred to as the system matrix. $a_{ij}$ represents geometric contribution between an i-th ray and the j-th pixel. According to the Radon transform, X-ray CT imaging may be expressed by formula (1):

$$b = Ax. \qquad (1)$$

Then, an inverse problem of the image reconstruction is described as calculating the reconstructed image x through projection data b in a case of a given system matrix A.

For the above inverse problem, if an inverse matrix $A^{-1}$ of the system matrix A exists, the reconstructed image may be directly obtained through $x=A^{-1}b$. However, in the general medical imaging applications, the system matrix A is so large that the entire matrix cannot be stored in the computer simultaneously, thereby causing impossibility to directly perform transform of A (e.g., a diagonalization operation on A in singular value decomposition to obtain a generalized inverse matrix). Therefore, in conventional iterative reconstruction, only a method of performing iteration by using the system matrix A and a transpose matrix $A^T$ (without transform) thereof may be used to find an approximate solution of an equation set, which causes long iteration time and impossibility to solve the equation set quickly.

In the embodiments of the present disclosure, the large system matrix may be stored in the computer device, so as to perform the transform on the system matrix A to obtain the inverse matrix of the system matrix A. The inverse matrix is stored in advance, so that through the inverse matrix, rapid medical image reconstruction may be achieved.

Figure 2:
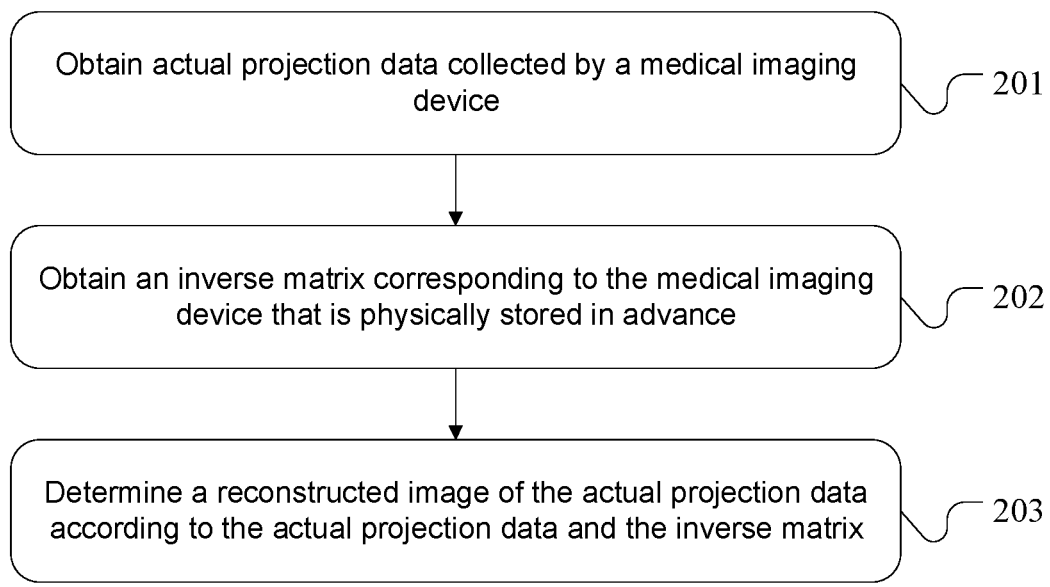
FIG. 2 is a schematic flow diagram of a medical image reconstruction method, following some embodiments.
Figure 3:
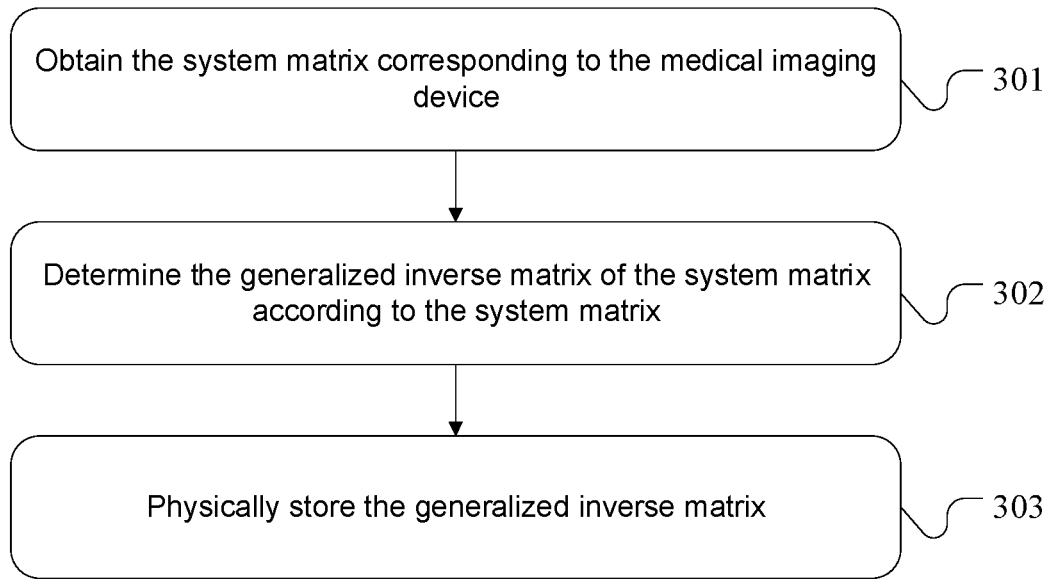
FIG. 3 is a schematic flow diagram of another medical image reconstruction method, following some embodiments.

FIG. 2 is a schematic flow diagram of a medical image reconstruction method, in accordance with some embodiments. As shown in FIG. 2, the medical image reconstruction method includes the following step 201 to step 203.

In step 201, real projection data collected by the medical imaging device is obtained.

For example, when a patient is diagnosed or treated with the help of the medical imaging device, medical imaging data of the patient may be collected through the medical imaging device. For example, in the medical imaging device, real projection data is acquired by rays passing through the patient.

In step 202, an inverse matrix corresponding to the medical imaging device that is physically stored in advance is obtained.

The inverse matrix is obtained by performing an inverse operation based on a system matrix corresponding to the medical imaging device. The system matrix indicates a geometrical relationship between projection rays of the medical imaging device at each view angle and reconstructed image pixels. The inverse matrix indicates calculated projection data corresponding to the medical imaging device.

In the embodiments of the present disclosure, the calculated projection data corresponding to the medical imaging device is comprehensive projection data obtained by performing a comprehensive projection simulation on the medical imaging device. For example, the calculated projection data may be obtained by implementing the comprehensive projection simulation by pre-modeling the medical imaging device.

In an example in which the medical imaging device is the CT device, a principle of the comprehensive projection simulation of the medical imaging device is as follows. For a certain reconstruction angle, a comprehensive projection of an estimated object image is first simulated through a "forward projection", which is a first estimation of attenuation from the reconstruction angle, but there is a large error. This estimation simulates as much as possible a process of X-ray photons passing through an object and reaching a detector in a real CT device, in which a finite size of a focus is simulated by setting initial positions of the X-ray photons in a small region instead of separate points. In a process of modeling an interaction between the X-ray photons and the object, a size of a pixel (not hypothetical point) of the reconstructed image is considered by calculating lengths of paths along which the photons pass through a voxel after entering the voxel in slightly different directions and at slightly different positions. In a same way, a size and a shape of a detector unit in the detector are modeled through a detector response function. Finally, the calculated projection data corresponding to the medical imaging device is obtained through simulation.

In step 203, a reconstructed image of the real projection data is determined according to the real projection data and the inverse matrix.

In some embodiments, since there is a large amount of noise in an actual projection process, in order to improve a quality of the reconstructed image, the step 203 may include: determining the reconstructed image of the real projection data according to the real projection data and the calculated projection data.

For example, the step 203, in which the reconstructed image of the real projection data is determined according to the real projection data and the inverse matrix, includes: comparing the real projection data and the calculated projection data to obtain projection difference data; and updating the projection difference data through a back-projection and forward-projection iteration until the projection difference data is minimum, so that the reconstructed image of the real projection data is obtained.

The iterative reconstruction method of the real projection data may be a simultaneous algebraic reconstruction technique (SART), weighted least squares (WLS), maximum likelihood-expectation maximization (ML-EM), or the like, which is not limited herein.

The step of comparing the real projection data and the calculated projection data to obtain the projection difference data is described by taking an example in which the calculated projection data and the real projection data each include forward projection data. Firstly, an original estimation is performed on distribution of the X-ray photons, and based on this, a possible count (i.e., calculated projection data) obtained by the detector in each projection direction is estimated. Then, the calculated projection data is compared with real projection data collected by the detector to obtain the projection difference data; a back projection is performed according to the projection difference data to obtain a current reconstructed image; and a forward projection is performed for the current reconstructed image to update the calculated projection data. This process is continuously repeated to continuously check and correct calculated projection data corresponding to the image until the error (i.e., the projection difference data) is reduced to the minimum, and a next iteration result is infinitely close. As a result, the reconstructed image of the real projection data is obtained.

It will be noted that, in a process of correcting the calculated projection data, in addition to a system optical model, a system statistical model is also adopted. The system statistical model analyzes features of statistical fluctuation of each individual photon, and compares the features with correct statistical distribution, which effectively reduce the noise of the reconstructed image caused by the statistical fluctuation.

In the embodiments of the present disclosure, the real projection data collected by the medical imaging device is obtained; the inverse matrix corresponding to the medical imaging device that is physically stored in advance is obtained, the inverse matrix being obtained by performing the inverse operation based on the system matrix corresponding to the medical imaging device; the reconstructed image of the real projection data is determined according to the real projection data and the inverse matrix. That is, by storing the large system matrix in the computer device, the inverse matrix of the system matrix corresponding to the medical imaging device is obtained and stored. Through the inverse matrix and the real projection data, the rapid image reconstruction may be achieved, reconstruction efficiency of the medical image may be improved, and wide application and development of the iterative reconstruction technology in clinical practice may be promoted.

In some embodiments, the inverse matrix is a generalized inverse matrix, and before the inverse matrix corresponding to the medical imaging device is obtained, as shown in FIG. 2, the method may further include the following step 301 to step 303.

In step 301, the system matrix corresponding to the medical imaging device is obtained.

The system matrix is very large, and the system matrix used in the reconstruction process is physically stored in the computer device in advance for subsequent operation to obtain the generalized inverse matrix of the system matrix. Therefore, before the system matrix corresponding to the medical imaging device is obtained, the medical image reconstruction method may further include physically storing the system matrix in the computer device.

For example, the system matrix corresponding to the medical imaging device indicates the geometrical relationship between the projection rays of the medical imaging device at each view angle and the reconstructed image pixels. In the example in which the medical imaging device is the CT device, the system matrix A of the CT device is constructed from a geometric perspective of the CT device, considering actual physical factors such as a size of a ray source, an X-ray energy spectrum, and response of the detector in the imaging system. The system matrix corresponding to the medical imaging device may be obtained in various ways, which will be described by way of examples.

Assuming the system matrix A is $A=\{a_{ij}|i=1,\ldots,I, j=1,\ldots,J\}\in R^{I\times J}$, where the element $a_{ij}$ in A may represent the geometric contribution between the i-th ray and the j-th pixel, and the most basic expression of the geometric contribution is a length of a line segment through which the projection ray passes in the pixel. Moreover, physical phenomena (e.g., the attenuation and a point spread function) encountered in the imaging may also be put into the model of the system matrix A.

Obtaining the system matrix corresponding to the medical imaging device may include: scanning a preset calibration phantom in the medical imaging device to obtain sample projection data; and determining the system matrix corresponding to the medical imaging device based on a preset mathematical model, the preset mathematical model indicating an operational relationship among the calibration phantom, the sample projection data and the system matrix.

For example, a calibration phantom x (as shown in FIG. 1) is scanned in an actual imaging device to obtain sample projection data b, and the system matrix A of the actual imaging device is obtained by using deep learning technology based on a mathematical model b=Ax.

The deep learning technology may be a model framework of deep learning used in medical image processing, and mainly includes:

stacked autoencoder (SAE), which has no supervised learning scheme, is trained layer by layer, and is mainly to obtain feature description;

restricted Boltzmann machine (RBM), which has no supervised learning scheme, and is similar to SAE;

convolutional neural network (CNN), which is the most widely used, and may be used to extract image features or to directly complete tasks such as classification detection;

recurrent neural network (RNN), which is used to obtain timing information and used in progressive image scanning such as CT;

U-Net (with a single downsampling stage), which is similar to a fully convolutional neural network with short-cut, and is used to fuse features of images of different scales;

fully convolutional neural network (FCNN), which may obtain a picture with the same resolution as that of an original picture, and is commonly used for tasks such as segmentation; and faster region-based convolutional neural network (Faster R-CNN), which is a fast deep learning detection network framework, is divided into two layers, i.e., a region proposal network (rpn) and rcnn, and is used to detect various objects in a medical image.

The method of obtaining the system matrix A of the medical imaging device by using the deep learning technology based on the mathematical model b=Ax is the prior art, which is not limited herein.

In step 302, the generalized inverse matrix of the system matrix is determined according to the system matrix.

In some embodiments, the step 302, in which the generalized inverse matrix of the system matrix is determined according to the system matrix, includes: performing the singular value decomposition on the system matrix to obtain the generalized inverse matrix of the system matrix.

In step 303, the generalized inverse matrix is physically stored.

In general medical imaging applications, the system matrix A is very large. In these embodiments, the system matrix A used in the reconstruction process is subjected to transforms on the computer device to obtain the generalized inverse matrix $A^{Pinv}$ of the system matrix, and the generalized inverse matrix is stored to improve a calling speed in subsequent image reconstruction.

An iterative process of the iterative reconstruction algorithm may be decomposed into four steps: forward projection, correction, back projection and voxel update. In the iterative reconstruction algorithm, compared with that the forward projection and the back projection use the same driving method, a combination of a forward projection that uses a ray-based driving method and a back projection that uses a voxel-based driving method may effectively remove ring-shaped artifacts. Therefore, in the iterative reconstruction algorithm, the forward projection uses the ray-based driving method to calculate the system matrix, and the back projection uses the voxel-based driving method to calculate the system matrix. A difference between the two driving methods is that the former only consider the density of the rays passing through the voxel, while the latter also considers the impact of surrounding voxels on the voxel through which the current rays pass. In a code implementation process, the steps of the forward projection and the correction are usually combined and processed simultaneously, and the steps of the back projection and the voxel update steps are combined and processed simultaneously.

In the iterative reconstruction algorithm, computation cost of the forward projection and the back projection is huge, and accounts for a high proportion of the total computation cost of the iterative reconstruction algorithm. Therefore, a key to improving the operation speed of the iterative reconstruction algorithm is to improve the calculation efficiencies of the forward projection and the back projection.

For example, the system matrix may include a forward-projection matrix or a back-projection matrix, or both the forward-projection matrix and the back-projection matrix. In a case where the projection data includes the forward-projection data, the system matrix includes the forward-projection matrix. In a case where the projection data includes back-projection data, the system matrix includes the back-projection matrix. In a case where the projection data includes both the forward-projection data and the back-projection data, the system matrix includes both the forward-projection matrix and the back-projection matrix.

Since the system matrix corresponding to the medical imaging device is very large, the generalized inverse matrix of the system matrix is also very large. Therefore, the generalized inverse matrix may be compressed and stored in the computer device. The compressed data is stored to reduce the occupation of storage space.

Figure 4:
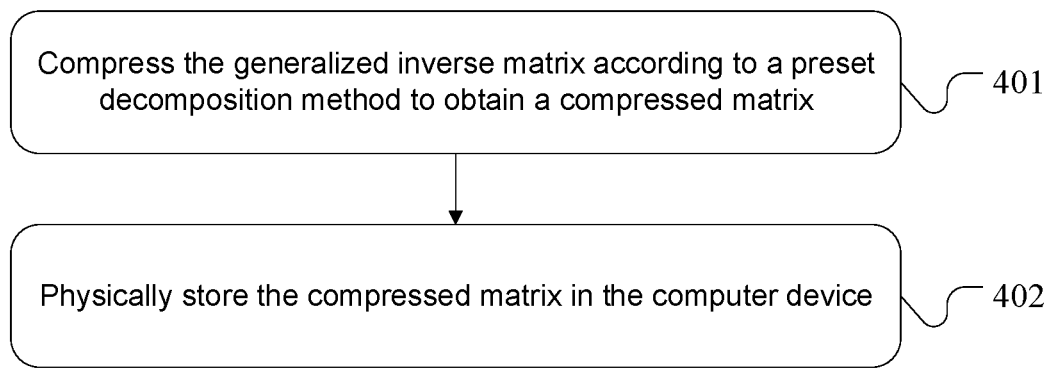
FIG. 4 is a schematic flow diagram of step 303 in FIG. 3, following some embodiments.

Therefore, in some embodiments, as shown in FIG. 4, the step 303, in which the generalized inverse matrix is physically stored, includes the following step 401 and step 402.

In step 401, the generalized inverse matrix is compressed according to a preset compression method to obtain a compressed matrix.

In step 402, the compressed matrix is physically stored in the computer device.

The preset compression method may be a compression method of a symmetric matrix, an upper (lower) triangular matrix, a sparse matrix, or the like. That is, in a case where the generalized inverse matrix satisfies a special matrix, such as the symmetric matrix, the upper (lower) triangular matrix, or the sparse matrix, a corresponding compression method may be adopted. In an example in which the generalized inverse matrix is the sparse matrix, a method of compressing and storing the sparse matrix is to store only non-zero elements in the matrix. When the non-zero elements in the sparse matrix are stored, row indexes and column indexes of the elements in the matrix need to be stored.

In this case, obtaining the inverse matrix corresponding to the medical imaging device that is physically stored in advance includes: obtaining the compressed matrix of the inverse matrix from the computer device; and decompressing the compressed matrix to obtain the inverse matrix.

Of course, in a case where the noise is low in the actual projection process, the reconstructed image may also be obtained through calculation according to formula $x=A^{Pinv}b$, in which x is the reconstructed image, $A^{Pinv}$ is the inverse matrix, and b is the real projection data.

For example, after physically stored inverse matrix $A^{Pinv}$ is obtained, the generalized inverse matrix $A^{Pinv}$ is first restored by using decompression and reconstruction technology, and then the reconstructed image of the real projection data is obtained according to the real projection data b and the generalized inverse matrix $A^{Pinv}$ through the formula $x=A^{Pinv}b$.

Further, in some embodiments, for different clinical diagnostic image requirements, a priori knowledge of a diagnostic image may be introduced in the reconstruction process, so that the quality of the reconstructed image may be improved. For example, the medical image reconstruction method further includes: obtaining the priori knowledge of the diagnostic image in a preset application scenario; and processing the reconstructed image according to the priori knowledge to obtain a processed reconstructed image.

The priori knowledge may be L1 norm, total variation and other priori knowledge used in the conventional Bayes multi-frame image super-resolution method, or a priori knowledge of a natural image, which is not limited herein.

It will be noted that, in some embodiments, before the real projection data collected by the medical imaging device is obtained, raw projection data collected by the medical imaging device may be pre-processed to obtain the real projection data. A pre-processing method may be an image enhancement method, such as grayscale transform in a spatial domain (e.g., direct grayscale transform, a histogram correction method, or algebraic operation of an image), or filtering in the spatial domain (e.g., image smoothing processing or image sharpening processing), or high-pass filtering, low-pass filtering, band-pass filtering, band-stop filtering or the like in a frequency domain, which is not limited herein.

For example, in order to reduce the noise in the raw projection data, the raw projection data may be non-linearly filtered, or filtered based on the Bayes statistical theory. In order to overcome strip-shaped artifacts, ring-shaped artifacts, metal artifacts and cup-shaped artifacts in the reconstructed image, the raw projection data may be processed by using an emerging image processing method based on dictionary learning, morphological component analysis or the like, and the processed data and parameters related to the reconstruction may be transmitted to a graphics processing unit (GPU) of the computer device. The processed data and the parameters related to the reconstruction refer to a position and a size of the phantom, a position of a rotation center, a distance from the ray source to the rotation center, a size of the detector, a distance from the detector to the rotation center and a projection angle. Since the processed data and the parameters are in a central processing unit (CPU) of the computer device, the data and the parameters also need to be transmitted to the GPU of the computer device to accelerate the process.

In addition, in some embodiments, the medical image may also be reconstructed by using pipeline technology. A working principle of the pipeline technology is that processing elements of an array processor sequentially perform respective tasks separately, and the next processing is performed immediately after a previous task is completed, so that the pre-processing, convolution, back projection and the like may be performed simultaneously in most of the time. As a result, the speed of the image reconstruction is accelerated, and after the scanning of the CT image is completed, the reconstruction work may be almost completed in real-time, and the image may be displayed immediately.

It can be understood that, in the embodiments of the present disclosure, during the image reconstruction, in addition to the projection data, other parameters related to the reconstruction are also included, such as the position and the size of the phantom, the position of the rotation center, the distance from the ray source to the rotation center, the size of the detector, the distance from the detector to the rotation center and the projection angle when the projection data is obtained. Since no improvement of specific parameters is involved, for a specific process, reference may be made to the prior art, and details will not be described in detail herein.

Figure 5:
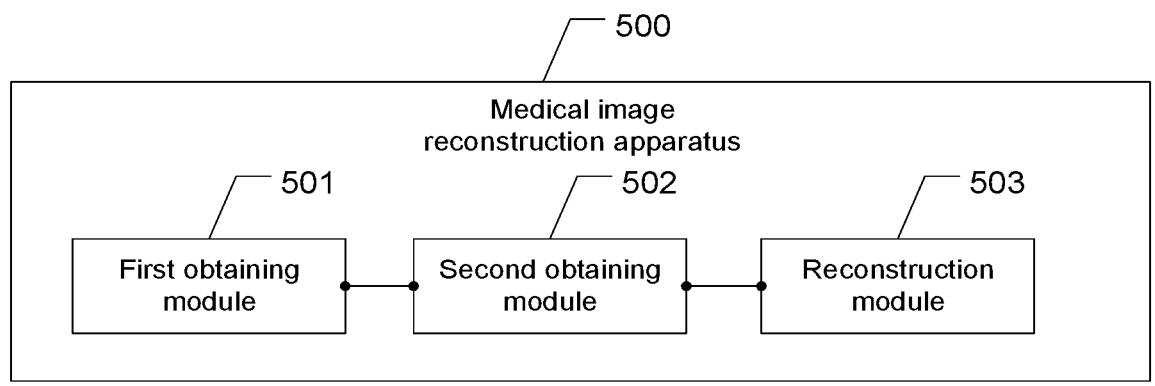
FIG. 5 is a schematic block diagram of a medical image reconstruction apparatus, following some embodiments.

In order to better implement the medical image reconstruction method, based on the medical image reconstruction method, some embodiments of the present disclosure provide a medical image reconstruction apparatus applied in the computer device. The computer device is communicatively connected to the medical imaging device. As shown in FIG. 5, the medical image reconstruction apparatus 500 includes a first obtaining module 501, a second obtaining module 502, and a reconstruction module 503.

The first obtaining module 501 is used to obtain the real projection data collected by the medical imaging device.

The second obtaining module 502 is used to obtain the inverse matrix corresponding to the medical imaging device that is physically stored in advance. The inverse matrix is obtained by performing the inverse operation based on the system matrix corresponding to the medical imaging device. The system matrix indicates the geometrical relationship between projection rays of the medical imaging device at each view angle and reconstructed image pixels. The inverse matrix indicates the calculated projection data corresponding to the medical imaging device.

The reconstruction module 503 is used to determine the reconstructed image of the real projection data according to the real projection data and the inverse matrix.

In the embodiments of the present disclosure, the first obtaining module 501 obtains the real projection data collected by the medical imaging device; the second obtaining module 502 obtains the inverse matrix corresponding to the medical imaging device that is physically stored in advance, and the inverse matrix is obtained by performing the inverse operation based on the system matrix corresponding to the medical imaging device; the reconstruction module 503 determines the reconstructed image of the real projection data according to the real projection data and the inverse matrix. By storing the large system matrix in the computer device, the inverse matrix of the system matrix corresponding to the medical imaging device is obtained and stored. Through the inverse matrix and the real projection data, the rapid image reconstruction may be achieved, the reconstruction efficiency of the medical image may be improved, and the wide application and development of the iterative reconstruction technology in clinical practice may be promoted.

In some embodiments, the inverse matrix indicates the calculated projection data corresponding to the medical imaging device; the reconstruction module 503 is used to determine the reconstructed image of the real projection data according to the real projection data and the calculated projection data.

In some embodiments, the reconstruction module 503 is used to: compare the real projection data and the calculated projection data to obtain the projection difference data; and update the projection difference data through the back-projection and forward-projection iteration until the projection difference data is minimum, so that the reconstructed image of the real projection data is obtained.

In some embodiments, the reconstruction module 503 is used to: perform back projection according to the projection difference data to obtain a current reconstructed image of the real projection data; and a forward projection is performed for the current reconstructed image of the real projection data to update current calculated projection data until the projection difference data is minimum.

In some embodiments, the inverse matrix is a generalized inverse matrix, and the apparatus further includes a storage module. The storage module is used to: obtain the system matrix corresponding to the medical imaging device; determine the generalized inverse matrix of the system matrix; and physically store the generalized inverse matrix in the computer device.

In some embodiments, the storage module is further used to physically store the system matrix in the computer device before the system matrix corresponding to the medical imaging device is obtained.

In some embodiments, the storage module is used to: scan the preset calibration phantom in the medical imaging device to obtain the sample projection data; and determine the system matrix corresponding to the medical imaging device based on the preset mathematical model, the preset mathematical model indicating the operational relationship among the calibration phantom, the projection data and the system matrix.

In some embodiments, the projection data includes the forward-projection data, and the system matrix includes the forward-projection matrix.

Alternatively, the projection data includes the back-projection data, and the system matrix includes the back-projection matrix.

Alternatively, the projection data includes both the forward-projection data and the back-projection data, and the system matrix includes both the forward-projection matrix and the back-projection matrix.

In some embodiments, the storage module is used to: perform the singular value decomposition on the system matrix to obtain the generalized inverse matrix of the system matrix.

In some embodiments, the storage module is used to: compress the generalized inverse matrix according to the preset compression method to obtain the compressed matrix; and physically store the compressed matrix in the computer device.

In some embodiments, the compression method includes symmetric matrix compression, upper triangular matrix compression, lower triangular matrix compression, or sparse matrix compression.

In some embodiments, the second obtaining module 502 is used to: obtain the compressed matrix of the inverse matrix from the computer device; and decompress the compressed matrix to obtain the inverse matrix.

In some embodiments, the reconstruction module 503 is further used to: obtain the priori knowledge of the diagnostic image in the preset application scenario, and process the reconstructed image according to the priori knowledge to obtain the processed reconstructed image.

In some embodiments, the reconstructed image of the real projection data, the real projection data and the inverse matrix satisfy the following relationship: $x = A^{Pinv}b$, in which x is the reconstructed image of the real projection data, $A^{Pinv}$ is the inverse matrix, and b is the real projection data.

In some embodiments, the first obtaining module 501 is further used to pre-process the raw projection data collected by the medical imaging device, the pre-processing method including one or more of image enhancement, filtering, dictionary learning, or morphological component analysis.

Some embodiments of the present disclosure provide a computer device, in which any medical image reconstruction apparatus provided by the embodiments of the present disclosure is integrated. The computer device includes at least one processor, a memory, and at least one application program. The at least one application program is stored in the memory, and is configured to cause the processor to perform the steps in the medical image reconstruction method described in any one of the above embodiments.

Figure 6:
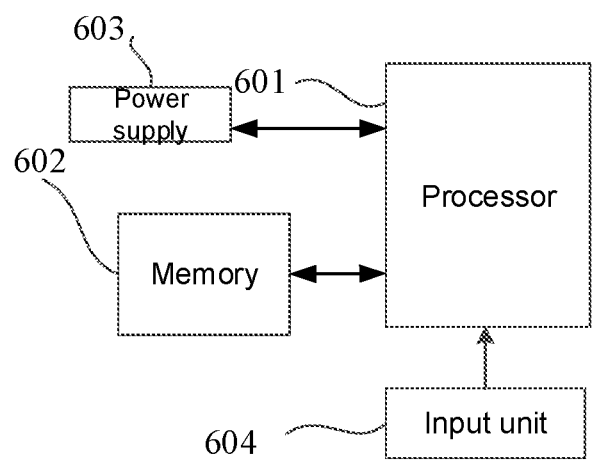
FIG. 6 is a schematic block diagram of a computer device, following some embodiments.

Some embodiments of the present disclosure provide a computer device, in which any medical image reconstruction apparatus provided by the embodiments of the present disclosure is integrated. As shown in FIG. 6, it is a schematic diagram showing a structure of a computer device, in accordance with some embodiments.

The computer device may include components such as a processor 601 with one or more processing cores, a memory 602 including one or more non-transitory computer-readable storage media, a power supply 603, and an input unit 604. A person skilled in the art can understand that, the structure of the computer device shown in FIG. 6 does not constitute a limitation on the computer device, and the computer device may include more or fewer components than those shown, or combinations of certain components or components with different arrangements.

The processor 601 is a control center of the computer device, and uses various interfaces and wires to connect various parts of the entire computer device. The processor 601 implements various functions of the computer device and processes data by running or executing software programs and/or modules stored in the memory 602, and calling data stored in the memory 602, thereby monitoring the computer device as a whole. For example, the processor 601 may include one or more processing cores. For example, an application processor and a modem processor may be integrated in the processor 601. The application processor mainly handles an operation system, a user interface, application programs and the like, and the modem processor mainly handles wireless communication. It can be understood that, the modem processor may also not be integrated into the processor 601.

The memory 602 may be used to store the software programs and modules. The processor 601 executes various functional applications and data processing by running the software programs and modules stored in the memory 602. The memory 602 may mainly include a program storage region and a data storage region. The program storage region may store the operation system, an application program required for at least one function (e.g., a sound playback function, and an image playback function), and the like. The data storage region may store data created according to use of the computer device, and the like. In addition, the memory 602 may include a high-speed random access memory, and may also include a non-volatile memory, e.g., at least one magnetic disk storage device, a flash memory device, or any other volatile solid-state storage device. Correspondingly, the memory 602 may further include a memory controller to provide the access of the processor 601 to the memory 602.

The computer device includes the power supply 603 for supplying power to various components. For example, the power supply 603 may be logically connected to the processor 601 through a power management system, so as to implement functions such as charge management, discharge management, and power consumption management through the power management system. The power supply 603 may include one or more direct current (DC) or alternating current (AC) power supplies, a recharging system, a power failure detection circuit, a power converter or inverter, a power status indicator, and other arbitrary components.

The computer device may include the input unit 604. The input unit 604 may be used to receive input digital or character information, and generate keyboard, mouse, joystick, optical or trackball signal inputs related to user settings and function control.

Although not shown, the computer device may further include a display unit, which will not be repeated herein.

In these embodiments, the processor 601 in the computer device loads an executable file corresponding to a process of the at least one application program into the memory 602 according to the following instructions, and the processor 601 runs the at least one application program stored in the memory 602, thereby implementing various functions as follows: obtaining the real projection data collected by the medical imaging device; obtaining the inverse matrix corresponding to the medical imaging device that is physically stored in advance, the inverse matrix being obtained by performing the inverse operation based on the system matrix corresponding to the medical imaging device, and the inverse matrix indicating the calculated projection data corresponding to the medical imaging device; and determining the reconstructed image of the real projection data according to the real projection data and the calculated projection data.

A person of ordinary skill in the art can understand that, all or part of the steps in the various methods in the above embodiments may be completed through instructions, or by controlling associated hardware through instructions. The instructions may be stored in a non-transitory computer-readable storage medium and loaded and executed by the processor.

To this end, some embodiments of the present disclosure provide a non-transitory computer-readable storage medium. The storage medium may include a read only memory (ROM), a random access memory (RAM), a magnetic disk or an optical disk. The storage medium stores computer program instructions that, when executed by the processor, cause the processor to perform steps in any medical image reconstruction method provided by the embodiments of the present disclosure.

For example, when the computer program instructions are executed by the processor, the processor may perform: obtaining the real projection data collected by the medical imaging device; obtaining the inverse matrix corresponding to the medical imaging device that is physically stored in advance, the inverse matrix being obtained by performing the inverse operation based on the system matrix corresponding to the medical imaging device, and the inverse matrix indicating the calculated projection data corresponding to the medical imaging device; and determining the reconstructed image of the real projection data according to the real projection data and the calculated projection data.

In the above embodiments, the description of each embodiment has its own focus. For parts that are not described in detail in a certain embodiment, reference may be made to the above detailed description in other embodiments, and details will not be repeated herein.

In a specific implementation, the above units or structures may be implemented as separate entities, or may be implemented in any combination as the same entity or several entities. For the specific implementation of the above units or structures, reference may be made to the foregoing method embodiments, and details will not be repeated herein.

For specific implementation of the above operations, reference may be made to the foregoing embodiments, and details will not be repeated herein.

The medical image reconstruction method, the medical image reconstruction apparatus, the computer device, and the storage medium provided by the embodiments of the present disclosure have been described in detail above. The principles and embodiments of the present disclosure are described in detail by using specific examples. The description of the above embodiments is only used to help understand the methods and core ideas of the present disclosure. In addition, for a person skilled in the art, according to the ideas of the present disclosure, there will be changes in the specific implementation and the application scope. In summary, the contents of this description should not be construed as limitations on the present disclosure.

What is claimed is:

1. A medical image reconstruction method performed by a computer device, the computer device being communicatively connected to a medical imaging device, and the medical image reconstruction method comprising:
    obtaining real projection data collected by the medical imaging device;
    obtaining an inverse matrix corresponding to the medical imaging device that is physically stored in advance, wherein the inverse matrix is obtained by performing an inverse operation based on a system matrix corresponding to the medical imaging device, and the system matrix indicates a geometrical relationship between projection rays of the medical imaging device at each view angle and reconstructed image pixels; and
    determining a reconstructed image of the real projection data according to the real projection data and the inverse matrix;
    wherein the inverse matrix is a generalized inverse matrix, and performing the inverse operation based on the system matrix corresponding to the medical imaging device includes:
        obtaining the system matrix corresponding to the medical imaging device; and
        obtaining the generalized inverse matrix of the system matrix according to the system matrix, wherein obtaining the generalized inverse matrix of the system matrix according to the system matrix includes:
            performing singular value decomposition on the system matrix to obtain the generalized inverse matrix of the system matrix; and
    the medical image reconstruction method further comprises:
        storing the generalized inverse matrix of the system matrix in the computer device, wherein the generalized inverse matrix of the system matrix is compressed into a compressed matrix before being stored in the computer device.

2. The medical image reconstruction method according to claim 1, wherein the inverse matrix indicates calculated projection data corresponding to the medical imaging device, and determining the reconstructed image of the real projection data according to the real projection data and the inverse matrix includes:
    determining the reconstructed image of the real projection data according to the real projection data and the calculated projection data.

3. The medical image reconstruction method according to claim 2, wherein determining the reconstructed image of the real projection data according to the real projection data and the calculated projection data includes:
    comparing the real projection data and the calculated projection data to obtain projection difference data; and
    updating the projection difference data through a back-projection and forward-projection iteration until the projection difference data is minimum, so that the reconstructed image of the real projection data is obtained.

4. The medical image reconstruction method according to claim 3, wherein updating the projection difference data through the back-projection and forward-projection iteration until the projection difference data is minimum, so that the reconstructed image of the real projection data is obtained includes:
    performing a back projection according to the projection difference data to obtain a current reconstructed image of the real projection data; and
    performing a forward projection for the current reconstructed image to update current calculated projection data until the projection difference data is minimum.

5. The medical image reconstruction method according to claim 3, wherein the iteration method includes a simultaneous algebraic reconstruction technique (SART), weighted least squares (WLS), or maximum likelihood-expectation maximization (ML-EM).

6. The medical image reconstruction method according to claim 1, wherein the projection data includes forward-projection data, and the system matrix includes a forward-projection matrix; or
    the projection data includes back-projection data, and the system matrix includes a back-projection matrix; or
    the projection data includes both the forward-projection data and the back-projection data, and the system matrix includes both the forward-projection matrix and the back-projection matrix.

7. The medical image reconstruction method according to claim 1, wherein obtaining the system matrix corresponding to the medical imaging device includes:
scanning a preset calibration phantom in the medical imaging device to obtain sample projection data; and
determining the system matrix corresponding to the medical imaging device based on a preset mathematical model, the preset mathematical model indicating an operational relationship among the calibration phantom, the sample projection data and the system matrix.

8. The medical image reconstruction method according to claim 1, wherein the compression method includes symmetric matrix compression, upper triangular matrix compression, lower triangular matrix compression, or sparse matrix compression.

9. The medical image reconstruction method according to claim 1, wherein obtaining the inverse matrix corresponding to the medical imaging device includes:
obtaining the compressed matrix of the inverse matrix; and
decompressing the compressed matrix to obtain the inverse matrix.

10. The medical image reconstruction method according to claim 1, further comprising:
obtaining a priori knowledge of a diagnostic image in a preset application scenario; and
processing the reconstructed image according to the priori knowledge to obtain a processed reconstructed image.

11. The medical image reconstruction method according to claim 1, wherein the reconstructed image of the real projection data, the real projection data and the inverse matrix satisfy a following relationship:

$$x = A^{Pinv} b,$$

wherein x is the reconstructed image of the real projection data, $A^{Pinv}$ is the inverse matrix, and b is the real projection data.

12. The medical image reconstruction method according to claim 1, wherein before the real projection data collected by the medical imaging device is obtained, the medical image reconstruction method further comprises:
pre-processing raw projection data collected by the medical imaging device to obtain the real projection data, the pre-processing method including at least one of image enhancement, filtering, dictionary learning, or morphological component analysis.

13. A computer device, comprising:
at least one processor;
a memory; and
at least one application program that is stored in the memory, and is configured to cause the processor to perform the medical image reconstruction method according to claim 1.

14. A computer device, comprising:
at least one processor;
a memory; and
at least one application program that is stored in the memory, and is configured to cause the processor to perform the medical image reconstruction method according to claim 10.

15. A non-transitory computer-readable storage medium, storing computer program instructions that, when executed by a processor, cause the processor to perform the medical image reconstruction method according to claim 1.

16. A non-transitory computer-readable storage medium, storing computer program instructions that, when executed by a processor, cause the processor to perform the medical image reconstruction method according to claim 10.

17. A medical image reconstruction method performed by a computer device, the computer device being communicatively connected to a medical imaging device, and the medical image reconstruction method comprising:
obtaining real projection data collected by the medical imaging device;
obtaining an inverse matrix corresponding to the medical imaging device that is physically stored in advance, wherein the inverse matrix is obtained by performing an inverse operation based on a system matrix corresponding to the medical imaging device, and the system matrix indicates a geometrical relationship between projection rays of the medical imaging device at each view angle and reconstructed image pixels; and
determining a reconstructed image of the real projection data according to the real projection data and the inverse matrix;
wherein the inverse matrix indicates calculated projection data corresponding to the medical imaging device, and determining the reconstructed image of the real projection data according to the real projection data and the inverse matrix includes:
determining the reconstructed image of the real projection data according to the real projection data and the calculated projection data, wherein determining the reconstructed image of the real projection data according to the real projection data and the calculated projection data includes:
comparing the real projection data and the calculated projection data to obtain projection difference data; and
updating the projection difference data through a back-projection and forward-projection iteration until the projection difference data is minimum, so that the reconstructed image of the real projection data is obtained.

* * * * *